UNITED STATES PATENT OFFICE.

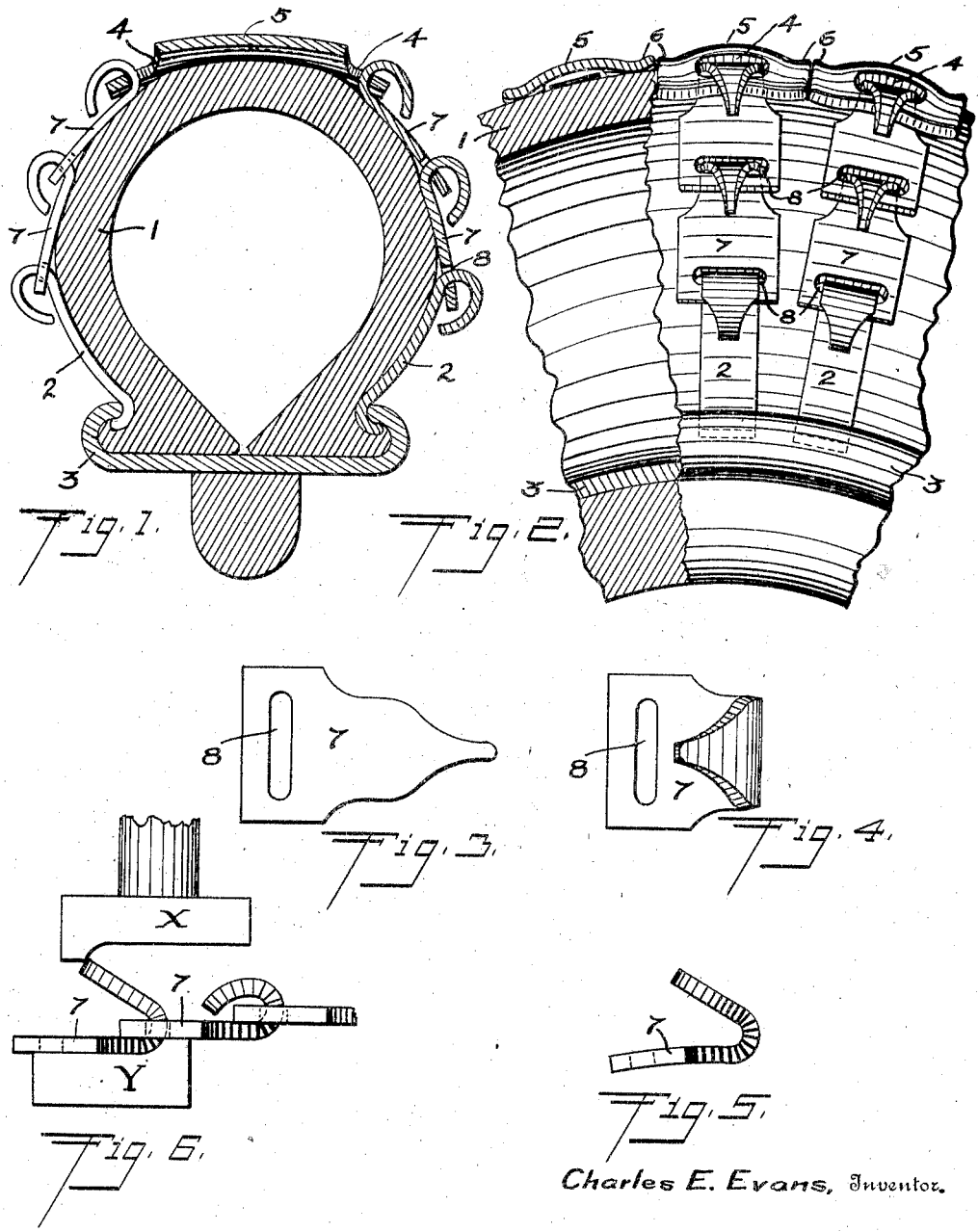

CHARLES E. EVANS, OF COUNCIL BLUFFS, IOWA.

PNEUMATIC-TIRE ARMOR.

No. 928,433.　　　　Specification of Letters Patent.　　　　Patented July 20, 1909.

Application filed February 7, 1908. Serial No. 414,807.

*To all whom it may concern:*

Be it known that I, CHARLES E. EVANS, a citizen of the United States, and a resident of Council Bluffs, in the county of Pottawattamie and State of Iowa, have invented certain new and useful Improvements in Pneumatic-Tire Armor, of which the following is a specification.

My invention relates to armor or shielding devices for preventing wear and puncture of pneumatic tires and the like.

It is the object of my invention to provide an armor of this type which may be made of light weight and sufficiently flexible not to materially reduce the resiliency of the tire; in which the form of the tread-plate is such that it will not cut the tire and will provide a corrugated surface to give the wheel a firm hold upon the ground and prevent slipping or skidding; and to provide links in which the parts connecting the same are of such form that they will bend naturally into a uniformly curved loop, thus enabling them to be assembled rapidly and cheaply with simple and inexpensive mechanism.

Constructions embodying my invention are shown in the accompanying drawings in which—

Figure 1 is a transverse section of a tire and wheel rim provided with my armor, Fig. 2 is a side elevation, partly sectional, of a portion of the tire and rim, Fig. 3 is a plan view of one of the connecting links before forming, Fig. 4 is a plan view of the link when formed and ready to assemble, Fig. 5 is a side view of the same, and Fig. 6 is a side view showing the manner in which the links are assembled.

The armor is composed of a series of short flat-linked chains placed around the tire 1 transversely thereof, the end members 2 of the chains being provided with hooks for engagement with the wheel rim 3 or, if desired, with any annular body disposed at the side of the tire. All of the chain members are preferably made by stamping or punching from sheet steel. The central member of each chain fits over the tread of the tire and will be herein referred to as the tread-plate. The said tread-plate is provided at the ends thereof with slots 4 adapted for engagement with the adjoining members of the chain. The tread-plate is curved longitudinally to a radius slightly larger than that of the tire over which it is to be placed, as shown in Fig. 1, and also has a transverse central bend 5 therein between the end slots thereof, while the longitudinal edges thereof 6 are curled slightly outward, as shown in Fig. 2. The longitudinal and transverse bending or arching of the tread-plates tends to stiffen the same so that they may be made of lighter material without being distorted by the pressure upon the wheel when in use. The outward curl of the longitudinal edges of the plate prevents the same from cutting the tire and also serves to turn aside any sharp-pointed object, such as a nail, which might strike the arch of the plate and be directed thereby toward the crack or opening between the adjoining edges of the plates. The central arching of the tread-plate, by holding the ends thereof up off the ground, also serves to reduce the distortion and wear of the curled ends of the adjoining links which pass through the slots 4 in the ends of the tread-plate.

The chain between the tread-plate and the end members 2 is formed by two or more links 7 each of which is provided with a slot 8 at one end thereof. The ends of the links 7, opposite the slots 8, are tapered as shown in Fig. 3, the sides of the tapered portion each forming a compound or ogee curve. After the said links are cut or punched to the form shown in Fig. 3, the tapered ends thereof are formed into hooks as shown in Figs. 4 and 5. In assembling the chains the hooked ends of the links are passed through the slots in the adjoining chain members and the hooks are then curled downwardly at the ends to form loops which are closed sufficiently to prevent the links being withdrawn therefrom. The closing of the hooks is conveniently performed by means of a pair of simple forming plates X and Y, as shown in Fig. 6, which may be held in any ordinary punch press. By the compound curve of the sides of the tapered ends forming the hooks on the links, the resistance thereof to bending stresses is so proportioned that the hook, when subjected to pressure near the end thereof, will bend naturally to a uniform curve. The large uniformly rounded loop which is thus formed makes a perfectly flexible connection between the chain members, so that the use of the armor does not materially reduce the resiliency of the tire.

Now, having described my invention, what I claim and desire to secure by Letters Patent is:

1. A tire armor comprising a plurality of chains disposed around the tire transversely thereof, each of said chains comprising a tread-plate, end members and links connecting said tread-plate and end members, the tread-plate having slots near the ends thereof, the central part thereof being arched transversely and the longitudinal edges being outwardly curled, the connecting links each having a slot near one end thereof, the opposite end being tapered, each side of the tapered portion forming a compound curve, and the tapered portions of the links being formed into loops.

2. In a tire protector, connecting links each having a slot near one end thereof, the opposite end being tapered, each side of the tapered portion having the form of a compound curve of which the portions adjoining the point and base of the tapered portion are concave and the central portions are convex, the tapered portions of each link being passed through the slot of an adjoining member of the protector and curled to form a loop.

In testimony whereof I have hereunto subscribed my name in the presence of two witnesses.

CHARLES E. EVANS.

Witnesses:
D. O. BARNELL,
ROY G. KRATZ.